(12) United States Patent
Betts-Lacroix et al.

(10) Patent No.: US 10,130,071 B2
(45) Date of Patent: Nov. 20, 2018

(54) ANIMAL CAGE

(71) Applicant: Vium, Inc., San Mateo, CA (US)

(72) Inventors: Jonathan Betts-Lacroix, Belmont, CA (US); Kevin Harada, San Francisco, CA (US)

(73) Assignee: Vium, Inc., San Mateo, CA (US)

( * ) Notice: Subject to any disclaimer, the term of this patent is extended or adjusted under 35 U.S.C. 154(b) by 103 days.

(21) Appl. No.: 15/396,062

(22) Filed: Dec. 30, 2016

(65) Prior Publication Data

US 2017/0105385 A1    Apr. 20, 2017

Related U.S. Application Data

(63) Continuation-in-part of application No. 14/631,230, filed on Feb. 25, 2015, now Pat. No. 9,671,276.

(51) Int. Cl.
  *G01G 19/52*    (2006.01)
  *A01K 1/03*    (2006.01)
  (Continued)

(52) U.S. Cl.
  CPC .............. *A01K 1/031* (2013.01); *A01K 1/015* (2013.01); *G01G 19/52* (2013.01); *G01G 21/22* (2013.01); *G01G 23/3728* (2013.01)

(58) Field of Classification Search
  CPC .... G01G 19/52; G01G 21/22; G01G 23/3728; A01K 1/015; A01K 1/031
  See application file for complete search history.

(56) References Cited

U.S. PATENT DOCUMENTS 5,895,894 A * 4/1999 Zumbach ............... G01G 21/30
                                                    177/124
8,796,565 B2 * 8/2014 Lauer ..................... G01G 21/28
                                                    177/243
(Continued)

FOREIGN PATENT DOCUMENTS

JP   H08-178736    *  7/1996   ............. G01G 21/28
JP   2005283328    * 10/2005   ............... G01G 1/24

OTHER PUBLICATIONS

English translation of JP H08-178736.*
English translation of JP 2005283328.*

*Primary Examiner* — Natalie Huls
(74) *Attorney, Agent, or Firm* — Kim Rubin, Patent Agent

(57) ABSTRACT

An animal cage is described suitable for automated use in a vivarium. The cage comprises a study animal; bedding; pathogens; a wireless, a sterilizable scale comprising a sterile case comprising a flexible, penetrated membrane; and a penetrating fastener penetrating the membrane. The comprises four internal volume areas with respect to pathogen content: (1) volume between the membrane and a weighing platform, free of bedding; (2) a sterile volume inside the scale case below the membrane; (3) a vertical channel fluidly connecting the inside of the cage with the first volume; and (4) the inside of the cage outside of the above three volumes. These four volumes are sterilely isolated from air outside the cage. Electronics in the scale communicate wirelessly, through the cage, to cage-associated electronics outside the cage, using narrow beam communications free of device-ID specific protocol. The scale may be disassembled, sterilized in a fluid, re-assembled, and re-used in a different cage.

14 Claims, 1 Drawing Sheet

(51) Int. Cl.
*A01K 1/015* (2006.01)
*G01G 21/22* (2006.01)
*G01G 23/37* (2006.01)

(56) References Cited

U.S. PATENT DOCUMENTS

| | | | |
|---|---|---|---|
| 8,797,166 B2* | 8/2014 | Triener | G01G 17/08 |
| | | | 340/573.1 |
| 9,671,276 B1* | 6/2017 | Betts-Lacroix | G01G 21/28 |
| 2012/0085291 A1* | 4/2012 | Conger | A01K 1/0047 |
| | | | 119/419 |
| 2014/0251228 A1* | 9/2014 | Jensen-Jarolim | A01K 29/005 |
| | | | 119/421 |
| 2016/0069737 A1* | 3/2016 | Canwell | G01G 21/28 |
| | | | 177/238 |
| 2016/0231167 A1* | 8/2016 | Masin | G06K 7/10386 |
| 2017/0108368 A1* | 4/2017 | Harada | G01G 19/00 |
| 2017/0108369 A1* | 4/2017 | Harada | G01G 17/08 |
| 2018/0103617 A1* | 4/2018 | Izumo | A01K 29/00 |

* cited by examiner

ANIMAL CAGE

BACKGROUND OF THE INVENTION

Vivariums house a number of animals, typically test animals, such as mice, in a number of cages, often a large number. The test animals are frequently used test drugs, genetics, animal strains, husbandry practices, methods of treatment, procedures, diagnostics, and the like. We refer to all such uses of a vivarium as a study.

Regular weighing of animals is an important part of studies. In the prior art, weighing is done by hand and labor intensive. The handling of the animals often changes their behavior or their health, altering the results or quality of the study. Also, handling the animals comprises the sterility of the cages and animals, putting the health of the animals and workers at risk.

Such manual weight recording is inherently infrequent due to the high labor time and cost. This infrequency creates three weakness of the prior art. First, problems may not be discovered until after an unacceptable delay, such as a failure to eat. Second, subtle behavior or health attributes, such as an animal's eating schedule, will be missed. Third, manual handling requires light for the worker. For many animals, this light interferes with and alters their behavior and health, and thus alters the results of the study compared with animals in their natural lighting regimen.

Vivarium cages are normally pathogen-free. Animals and thus their cages must be isolated from outside pathogens or contamination and from pathogens or contamination from other animals or other cages. This presents a significant challenge to vivarium automation and in particular to in-cage animal weighing and automatic animal identification. Electronic equipment placed inside a cage may need to be discarded after a single study due to the inability to sterilize the equipment between studies. Such equipment may be an animal ID sensor, a scale, or a wireless transmitter. In addition, in order to keep the cages pathogen-free it is desirable to have as few cage penetrations as possible. This means that power or data wiring to electronic equipment inside the cage is undesirable. Although this requirement motivates wireless devices, these devices must then be battery powered, which adds to cost, size and weight, and may introduce pathogens. Batteries may have to be changed out during a study, which adds to both equipment and labor costs and may introduce pathogens.

Sterility or pathogen free is important in vivariums to assure the health of the animals and the health of the workers. Also, sterility is critical for accurate, consistent, credible and repeatable study results. Sterility refers to the sufficient restriction of pathogen type and quantity so as to not so affect the outcome of the study, or the health or the behavior of animals or people. Sterility also refers to husbandry attributes, supplies and usage, as well as health.

An automated scale to meet vivarium requirements must have the following features: electronics in a fully sterile enclosure; animal chew-proof exterior; all components sterilizable by immersion in a sterilizing fluid; internal, rechargeable batteries; wireless connectivity, ideally redundant, ideally narrow range, ideally bi-directional; tool-less assembly and disassembly for sterilization and charging; free of clogging from bedding; reusable in different cages; free of dangerous or poisonous elements to animals; and a cage-mounting configuration to avoid movement by cage animals. Prior art with these features has not been identified.

SUMMARY OF THE INVENTION

In one embodiment a cage comprises a scale comprising an upper module comprising a weighing platform, skirt, electronics and a wireless communication element; and a lower module comprising a case with electronics, a load cell, and power source covered with a sealing, flexible, complaint membrane. The membrane is penetrated by a rigid penetrating element that provides both rigid weight-bearing connectivity from the upper module to the load cell and electrical connections from the electronics in the case to electronics on the upper module.

The case of the scale is sealed by the membrane. A perimeter area of the membrane is attached to a perimeter of the case with a sterile seal and optionally by the use of a membrane frame. The membrane comprises three area regions: the perimeter area; a central area that is penetrated by the rigid penetrating element; and a compliance area that isolates the perimeter area from the central area. The penetration is sealed at its penetration. Seals provide sterility, meaning a barrier against pathogens that could harm the animal, cage, cage air, or study results.

The platform skirt of the weighing platform scale surrounds the upper perimeter of the case. The platform skirt prevents bedding and other detritus from entering the volume between the upper module and the membrane, yet allows free movement and also air, and thus airborne pathogens.

The case of the scale comprises a load cell or other weight-measuring element; electronics, chargeable power source such as lithium batteries, a processor and communication electronics.

The upper module of the scale comprises wireless communication, such as a radio or optical, which may be bi-directional and may be redundant. The wireless scale electronics communicates with electronics outside the cage, such as directly above the cage, through the cage. The antenna or optical element in the scale connects to electronics in the case via connections inside the penetrating element. The one or more communications elements have a narrow beam to avoid interference with electronics associated with other cages.

The weighing platform and skirt of the scale are made from non-poisonous material and are shaped, such as with edge and corner radii, to be chew resistant. The skirt may be dimensioned, configured, and shaped to avoid contamination between the skirt and the case, such as by bedding. The power source in the case may be charged via the same electrical connector that connects the upper and lower modules. The upper module may be removed via a simple mating element to the penetrating element. Mechanical removal of the upper module accomplishes electrical disconnection concurrently. The upper and lower modules are then separately sterilizable by immersion in a sterilizing fluid. Re-attaching the modules accomplishes mechanical connection and electrical connection concurrently. The scale case comprises peripheral projections or detents to secure it in inside the cage in a fixed cage location. The projections or detents may be configured to mate with the cage interior so the scale may be placed and removed by hand and held in place by gravity so that no tools or hand-operated fasteners are required.

DETAILED DESCRIPTION OF THE INVENTION

Figure 1:
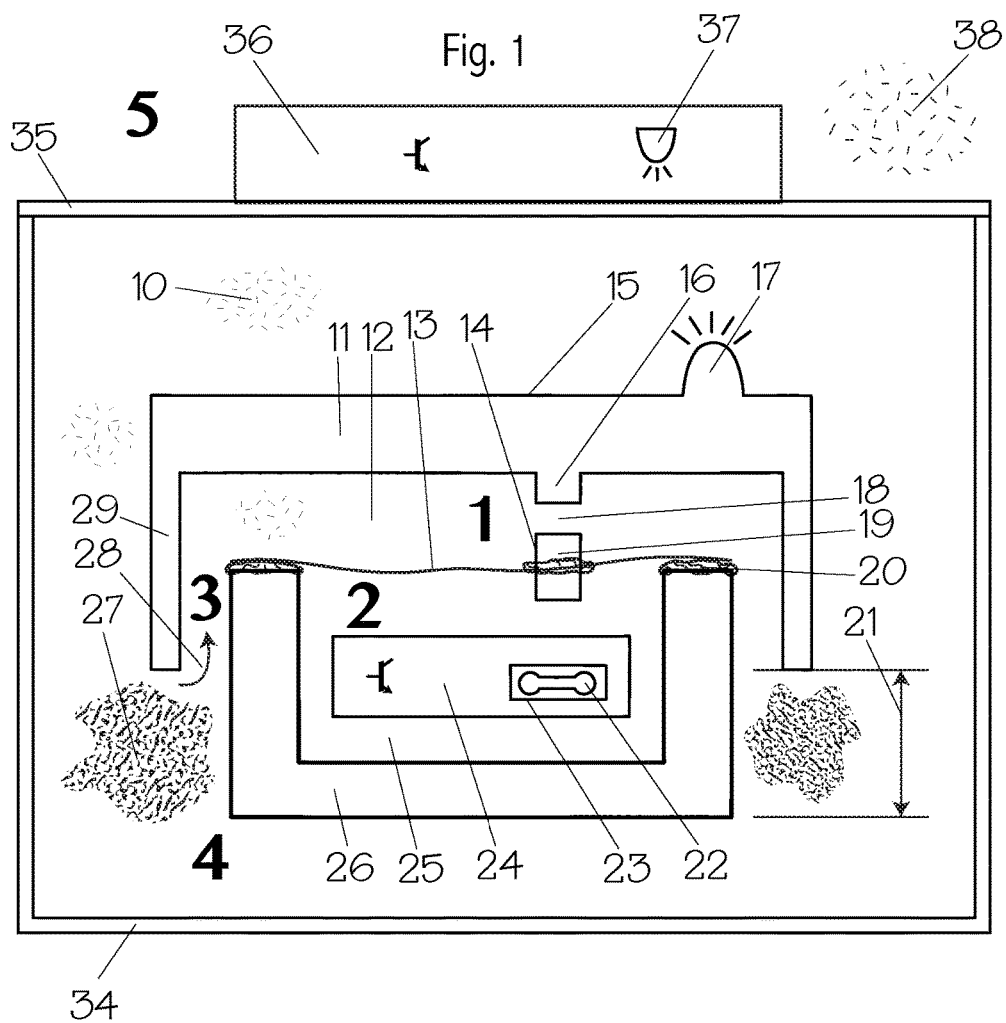
FIG. 1 shows a side view of a cage with exemplary upper and lower scale modules, scale skirt and penetrating element, and cage electronics.

Turning now to FIG. 1, we see a cut-away side view an embodiment. A cut-away view of the case 26 is shown. The case may be rectangular, oval, or another shape. The shape may fit conveniently in a corner or end of an animal cage. The material may be metal, such as stainless or galvanized steel or aluminum, or a plastic such as ABS or another plastic that is non-toxic if chewed and does not out-gas. The case may be injection molded, 3D printed, monolithic or assembled from components.

One embodiment comprises a cage 34 hosting a scale (26, 11 and attached elements). Embodiments may include communicating electronics outside the cage 36 that communicate through a cage top 35, using for example, communication elements 17 and 37. The cage top 35 or any portion of a cage between communication elements 17 and 37 must be optically transparent for optical communication or B or E field permissive for radio communications. Some embodiments use narrow beam angles for communication elements 17 or 37, or both, to prevent transmission or reception from interference with electronics in or associated with cages other than cage 34. Electronics 36 is physically associated with cage 34 and physically associated with scale electronics 24. Embodiments are free of required associations based on a device ID in communication protocols, also known as device pairing. Such freedom permits rapid deployment, replacement and reuse of electronics 36 and scale module 26 without concern for the necessity delays and problems associated with required device pairing.

A cut-away side view of a weighing platform 11 with a skirt 29 is shown. A top surface 15, of an upper module 11, may be considered a weighing platform; or the entire upper module (1 plus attached elements) may be considered a weighing platform. The weighing platform surface 15, communication element(s) 17, skirt 29 and mechanical and electrical mating elements 16 are the primary components of the upper module 1. The weighing platform skirt 29 overlaps the upper perimeter of the case 26 creating a vertical opening, column or gap 28 that is narrow enough and high enough to minimize penetration in the opening of cage detritus such as bedding, yet wide enough to achieve mechanical clearance between the weighing platform and case and also to not collect moisture. The weighing platform clears the membrane and optional membrane frame sufficient for the weighing platform to move or to pass pressure through the penetrating element, and tolerate manufacturing and operational tolerances, age, and distortion, and to avoid accumulation of moisture. Note that pathogens 10, vapors and aerosols may pass from the interior of the cage (large digit 4) housing the scale, through the vertical opening 28 into volume large digit 3, and then between the upper module 11 and the upper surface of the membrane 13, large digit 1. This volume 12 (large digit 1) is open to pathogens. Height 21 shows the height of the base of skirt above the cage floor, sufficiently high for free movement of bedding 27 without the bedding or other detritus from moving up the vertical gap 28.

An optional membrane frame is not shown. A membrane frame shape and dimensions are functionally matched to the top perimeter of the case. Typically, the membrane is first attached to the optional membrane frame, and then the frame is attached to the case. In one embodiment, the membrane provides the two functions: (i) sterile seal between the outside of the case and the inside; (ii) high compliance to not adversely affect a measured weight on top of the weighing platform. A rubber or latex sheet may be used. Sterile seals 20 and 14 may also or alternatively be provided via grease, calk, glue, adhesive, other gasket material, a pressure fit, and the like. Securing of the membrane to the optional frame may be via calk, glue, adhesive and the like. Securing of the membrane frame, if used, to the case may be via calk, glue, grease, adhesive, screws or other fasteners, clips, press-fit, clamps, magnets, and the like, in any combination. One purpose of the optional membrane frame is to hold the shape of the membrane uniform, such as substantially planer, with optional consistent sag in the compliance area (FIG. 2, 32), such that compliance of the membrane during weighing is minimal, linear or consistent (in any combination) so as to not adversely affect the weighing function of the scale. Scale calibration may then inherently take into account any action of the membrane on motion or pressure of the weighing platform relative to the case. A seal 20 between the membrane and the case is shown.

A side view of a rigid penetrating element 19 is shown. The purpose of this element is to transfer weight or pressure from the weighing platform surface 15 and the upper module 11, through the membrane 13, to the weighing sensor 23. Any number of intermediate or mechanically connecting elements may be in this weight-path. The rigidity required is sufficient for the function of the scale. Note in particular that the rigidity may be only in the vertical axis. For example, a point, a sliding connection, or horizontally compliance may be used, permitting one or more horizontal motions or rotational motions of the weighing platform relative to the weighing element. The penetrating element may be metal or plastic, similar to the material of the case. However, the penetrating element does not need to be chew resistant, except for any portion that penetrates the weighing platform and is not otherwise protected. In addition, the penetrating element may be solely or partially electrical connectors or their shells, although such weight-bearing or penetration functions are not typically a primary function of electrical connectors in the art. The penetrating element may be solely or partially circuit boards. The penetrating element may be solely or partially a screw, bolt or rod, hollow or solid. Sealing of the penetrating element where it meets the membrane may be accomplished similarly to sealing as described above for the membrane to the case. Reinforcement may be provided within or around the penetration area.

The weight sensor 23 may be a load cell or other weight or pressure sensing device or assembly. Its output may be electrical, electronic, digital or analog, or optical. A hollow interior of a load cell is shown 22. If the weight sensor is a load cell, a free end, not shown, is typically connected directly or indirectly to the penetrating element 19; while a fixed end, not shown, is connected directly or indirectly to the case 26. Note that such indirect connections may include the use of a circuit board, not shown.

Lower electronics 24 are in the case 26, large digit 2, are sealed against pathogens by the membrane 13 and membrane seals such 20 and 14. Immersion sterilizing fluid, such as could be used to sterilize the outside of the case, is often corrosive to electronic components and therefore such components should be protected from the immersion sterilizing fluid. Electronics include an interface to receive signals from the load cell or other weight sensor 23, interface to the wireless component(s) 17 in the upper module 11; a processor; non-transitory memory for both firmware and data, not shown explicitly; and a power source, such as rechargeable lithium batteries, not shown explicitly. These are well known in the art.

Optional upper electronics are in the upper module 11. These provide an interface between the electronics 24 in the lower module and the wireless communication elements 17. The upper module includes a mating connector 16 comprising electrical contacts to mate with the penetrating element 19. The wireless communication element(s) 17 may be an antenna(s), such as a patch antenna, or a near-field antenna, or optical transmitter(s) or transceiver(s). If optical, ideally the optical element is redundant (not shown) so that if an animal being weighed is covering one element, communication is preserved by use of the redundant element. Ideally, redundant optical elements are spaced so that an animal is unlikely to cover both elements at the same time, such as by placing the elements proximal to different corners of the upper module or by spacing them more than the average or maximum diameter, width or length of an animal being weighed.

Either optical elements 17 or radio elements should have a narrow beam angle upward to communicate to electronics located above the top of a cage housing the scale. In a vivarium, cages are typically closely spaced so it is necessary to prevent communication interference between cages. Therefore, a upward facing beam angle in the range of 5 to 120 degrees, 10 to 120 degrees or 15 to 90 degrees is desired. It is also desirable to have the power not in the such beam angle to be at least −3 db, −6 db, −12 db, −20 db, −30 db, or −40 db below the power in the such beam angle. An antenna may be a near-field antenna, configured with B field facing primarily vertical or upward to avoid interference with nearby cages.

A radio-receiving element or optical element 37 outside the cage may be defined at a height of 10 to 36 cm above the top 15 of the upper module 11 and directly above the center of the upper module 11 within 15, 30 or 45 degrees. A transmitting antenna in the upper module should have its power not reaching such a receiving element at least −3 db, −6 db, −12 db, −20 db, −30 db, or −40 db below the power reaching that receiving element. An antenna may broadcast signals balanced between B and E fields, or may be primarily a B field or an E field antenna. B field antennas have the advantage that they provide good near-field gain that drops off rapidly with distance preventing interference with nearby cages. An antenna may be a pad or loop, for example.

The upper module 11 may be removable from the lower module (26 with attached elements) by disconnecting the connector 16 from the connector 19, shown as the space 18. These two connectors, 16 and 19 also provide a weight path from the weighing surface 15 to the weight sensor 23. Multiple connectors providing multiple weight paths to a single or multiple (not shown) weight sensors may be used. Multiple connection points between the upper module and lower module may have the advantage of minimizing upper element or weighing platform tip or distortion.

A seal between one or more penetrating elements 19 and the membrane 13 is shown 14. Seal material may be similar to or dissimilar to the seal material 20 used between the membrane 13 and the case 26. Note that as shown 19 is both the penetrating element and a connector as part of the lower module.

A convenient way to visual pathogens in identifiable volumetric area is shown in FIG. 1 by the use of large digits, 1, 2, 3, 4, and 5. It is particularly important that pathogens in the cage 10 are isolated by the cage 34 and its cage top 35 from pathogens outside the cage 38 in area 5. It is important to protect animals in the cage from outside pathogens 38 as well as protect workers and the public from pathogens inside the cage, 10. It is necessary to protect scale electronics, in 2, from sterilization fluid that may be used to sterilize the outside of the scale case 26, areas 1, 3, and 4 from pathogens 10 inside the cage 4. Thus the need for a seal around volumetric area 2. It is necessary that a weighing platform or surface 15 be able to move freely in its connection to a weight sensor 23. Such motion is subject to contamination by bedding or detritus in the cage 27. Thus, air channel 3 needs to be open for such freedom of movement. Because area 3 is open, pathogens in the cage 10 can move freely into volumetric area 1. However, bedding and detritus 27 are blocked by the narrow vertical channel 3, keeping the membrane 13 free of contamination that would affect scale functionality.

Figure 2:
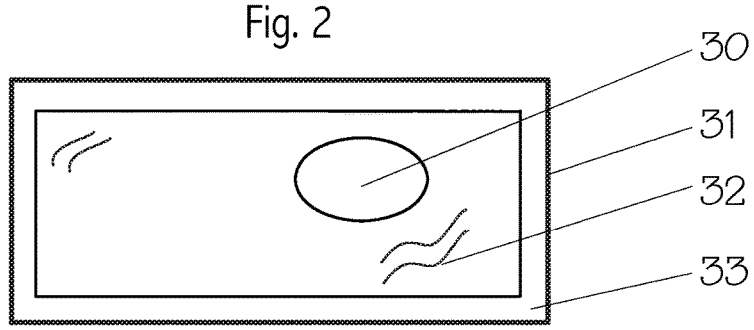
FIG. 2 shows a top view of areas in a flexible, exemplary compliant membrane of an in-cage scale.

Turning now to FIG. 2, we see an exemplary and overhead view of a planer, compliant membrane, whose edge is shown 31. This view may be either scale realistic or schematic only. A perimeter area 33 is shown where an optional membrane frame (not shown) connects to the membrane (FIG. 1, 13 and all of FIG. 2). A penetration area or zone 30 is shown, through which the penetration element (FIG. 1, 19) passes. Although the borders between these areas are shown by hard lines in the Figure, such borders may not be so well defined. The penetration area may be created by the penetrating element and optionally its seal (FIG. 1, 14) or reinforcement (not shown). The compliance area 32 should isolate the perimeter area 33 from the penetration area 30 to permit the weighing platform 11 to have free motion, restricted only by the compliance zone of the membrane, with respect to the case 26, as described elsewhere herein.

A nexus of embodiments is a membrane 13 that provides both a seal of the case 26 and its contents to preserve sterility of the interior 25 of the lower module (the case and attached elements) and flexibility to permit the motion or pressure of the upper module or weighing platform 11 to be transferred functional to one or more weight sensors, 23. Ideally, such compliance is both consistent and linear with weight.

Embodiments include more than one penetration element 19 and optionally more than one penetration area 30 of the membrane 13. For example, two or three penetration elements may be used to minimize tilt or distortion of the upper module 11 or the weighing platform surface 15. In some embodiments, connections between two, three or more penetration elements to the weighing platform are rigid only or predominantly in the vertical axis, in order to permit bend, manufacturing or operational tolerances in other axes and planes. Such a vertical-axis-specific rigid connection may be the tip of a screw or other element where the upper module rests via gravity on three or more of these supporting elements.

Elements connected to or part of the case to accomplish positional alignment within a cage include protruding pins, recesses or detents, concave corners, or protruding curved, hooked, or triangular projections. Such projections, recesses or detents may mate with corresponding features in a cage or other scale receptacle such that the scale may be placed and removed by simple vertical motion by hand. Curved, hooked, or triangular projections may be used to place a scale in a receptacle by first aligning the projection(s), and then rotating the scale into a horizontal position so the projection(s) engage. Such elements are not shown in FIG. 1.

A nexus of novelty is the use of the compliant membrane to accomplish both pathogenic sterility and compliance for weight bearing penetration. Another nexus is the use of a single penetration. Another nexus is the use of a combined mechanical weight-bearing penetration and electrical penetration element. Another nexus is the use of electronics in both the upper and lower modules that connect electrically via the penetration element. Another nexus is the configuration of the skirt to minimize detritus from moving upward through the skirt-case gap onto the membrane, while permitting free, unimpeded motion, constrained only a the compliance zone of the membrane, for weighing. Another nexus is the easy removal of the weighing platform weighing platform from the case to permit separate sterilization by immersion in a sterilizing fluid of both the upper and lower module. Another nexus is the use of a connector integrated with the penetrating element that provides two additional functions: electrical connectivity between the case and lit of wireless communication and an electrical charging port for a power source in the case. Another nexus is the use of one or more electrical connectors as the rigid element as described herein. Another nexus is the use of flexible membrane with three separate purpose areas as defined herein. Another nexus is the use of upward facing, narrow-beam optical or radio wireless communication elements in the upper module.

Yet another nexus is the use of wireless communications that are free of any protocol that requires establishing an ID-specific association between the scale and a receiver. This limitation permits any scale to be placed in any cage without having to first perform, manually or automatically, and association step. It also avoids the possibility of a scale in one cage associating with a receiver for a different cage. Such a result could invalidate an entire study.

Yet another nexus is the use of narrow beam communication from the electronics in the scale to cage-associated electronics outside the cage where such communication is free of interference with electronics in or associated with other cages and wherein no ID-based association is required between the scale electronics and the cage-associated electronics outside the cage.

Suitable horizontal dimensions for the scale may be in the range of 2 to 24 inches, or the range of 4 to 10 inches. Ideally, the scale is sized so that one animal to be weighed may easily position itself fully on the scale. Suitable corner radii of the scale case and weighing platform should be large enough to prevent or minimize chewing, or be made out of a chew-resistant material, or both. A suitable gap between inside of the perimeter skirt and an outside edge of the case is in the range of 1/64 to 1/2 inch, or in the range of 0.08 to 0.35 inch. The gap should be sized relative to the detritus or bedding in the cage. A suitable height for the overlap of the skirt over the case is in the range of 1/16 to 4 inches, or in the range of 0.125 to 2 inches. A suitable thickness of the membrane is in the range of 0.1 to 1.5 mm, or in the range of 0.2 to 0.8 mm. A suitable material for the membrane is neoprene, rubber or latex. Thickness should ideally depend on the desired weight range of the scale. Suitable heights for the base of the skirt above the cage floor, 21, are in the range of 1/8 inch to 4 inches, 1/4 inch to 3 inches, 1/2 inch to 2 inches.

A scale of an embodiment is suitable for use in, or used in, a sterile animal cage that is free of electrical penetrations.

A scale of an embodiment may be used for any purpose other than weighing animals, particularly in environment where sterility is important, including for people, infants, organs, use for biological or chemical research, hazardous material, explosion-proof environments, corrosive environments, radioactive environments, or for other medical or research use.

Although "sterile" and "sterilizing" are used in the disclosure of this invention, these words may also mean "clean" and "cleaning," particularly with respect to undesirable material or contamination, such as dust, liquids, chemicals and the like.

One embodiment uses IR (infrared) transmitters, which may also be transceivers. The IR communications may be through an IR transparent top of the animal cage. The IR optical path may be restricted with tubes or lenses to restrict the amount of stray IR light, which might comprise IR-sensitive cameras. The IR spectrum may be restricted to an IR range for which cameras are not sensitive. The IR communication may be modulated such that lower power is needed, so that this IR light is dim enough to not interfere with cameras.

One embodiment only transmits weight values when it receives wirelessly a command to do so.

One embodiment only transmits weight values when the weight on the scale changes more than a predetermined amount: absolute or relative change; increased or decreased weight. A series of weights may pass through a smoothing or averaging function prior to transmission. Such a function may minimize sudden apparent changes in weight to movement of the animal being weighed. This function maybe used in the data path for weight value transmissions, or may be used in the data path to detect a change of weight that triggers a new transmission, or both.

One embodiment transmits a first series of weight values during a first time interval, at a first time spacing between values; then, transmits a second series of weight values during a second time interval, at a second time spacing between values. For example, weighs may be transmitted at eight samples/sec for two seconds as a first series, at one sample per second for ten seconds for a second series.

One embodiment uses the transmitted scale weight in conjunction with an animal ID sensor. Such an animal ID sensor may be RF ID, capacitive using the top module, ECG electrical contacts on the top of the upper modules, or one or more camera images. If RFID is used, an RFID chip may be on the animals' ear; the RFID receiver may be in the scale or outside the animal cage. Numerous other forms of animal ID are known in the art. In one embodiment One embodiment comprises one or more IR transceivers in the upper module, facing upward. IR transmissions to and from these transceivers may be through a transparent cage top. Many other forms and configurations of wireless communication are known in the art.

One embodiment of a system of measurement and a method of measurement uses the sterile, wireless scale in an animal cage that uses an animal ID to associate and record weights on the scale with specific animals in a cage with more than animal.

One embodiment comprises one or more optical communication elements on the top of the lid that are elevated above the top of the lid so as to avoid optically interfering contamination, such as bedding.

One embodiment comprises one or more communication elements comprising a narrow beam angle so as to avoid interference with other cage or cage-associated communication elements.

One embodiment comprises a communication protocol free of device-ID specific association or device pairing. One embodiment comprises a communication protocol free of device-ID.

One embodiment comprises a case with at least one corner partially cut off or comprises a concave recess, or both, so as to mate with a curved inside corner of a cage.

Certain best modes or implementation notes, or elements of embodiments of a scale in an embodiment, are listed below:
(a) The spring pressure from the membrane should be minor and may be ignored or corrected for during calibration. With no weight on the weighing platform, the membrane may sag and thus generate an artificial weight. With some weight on the weighing platform, the membrane may be stretched and thus generate an upward force appearing as a negative weight.
(b) Scales should be calibrated at two points: a zero (tare weight) and at a nominal weight, such as an average weight of an expected load (e.g., a mouse or rat), or 10%, 25% or 50% of full scale. Such calibration assumes sufficient linearity and effectively generates an offset and slope of the weight v. voltage curve.
(c) Any twist or non-uniformity of the membrane may produce strange, inconsistent or non-linear forces. Thus, design, manufacturing and embodiments should strive to minimize any distortion, twisting, asymmetry, or non-uniformity of the membrane.
(d) The membrane may also be called a gasket, depending on context and what function or attribute of the membrane is being discussed.

A mouse typically weights about 25 grams. A rat weighs typically 200 to 500 grams. A scale with full-scale range of 1000 grams may be suitable for both mice and rats.
(e) Embodiments include limit stops for the upper module, which may be fixed height relative to the case or may be adjustable, such as screws or set screws.
(f) Lithium batteries may run 1 to 4 weeks between charging. Embodiments include charring through the same connector on the lower module that is used to connect to the upper module. Also embodiments include entering calibration data through this same connector. Embodiments include calibration (setting and storing calibration coefficient) via the communication port. Embodiments include no calibration parameters or coefficients stored in the scale but rather these are kept external, so that correcting raw scale data is done externally after the scale transmits scale weight as raw data. Embodiments include limit testing prior to transmission; storing, averaging and queuing of weight data.
(g) Steps in order used to recycle scales between cages and studies: separate upper and lower modules; clean both; charge lower module; sterilize both; then reassemble.

All embodiment and combinations may be used in a vivarium.

Embodiments are specifically claimed for a vivarium that uses a scale or cage as described in the specification, claims or drawings. Embodiments are specifically claimed for a method of operating vivarium that uses a scale or cage as described in the specification, claims or drawings.

Definitions

Value of a weight—a digital or analog weight, number, value, n-tuple, or a metric that can be used to compute a weight, or a metric derived from a weight. As one example, a simple digital reading from an analog-to-digital (A/D) converter that reads a voltage from a strain gauge or load cell may be a "value of a weight." As the k-factor of the strain gauge is known, as are other fixed constants and linear factors, the weight on the scale is easily computed from this value. In some contexts, a "weight" refers to this value of a weight.

Fixed—when two or more elements are fixed or affixed to each other, there may be or may not be intervening elements, such as spacers, rods, arms, washers and the like. So long as the two elements and the embodiment operate as if they are fixed, and they are effectively so mechanically coupled, the fixing is equivalent.

Electrically connected—when two or more elements are electrically or electronically connected to each other, or adapted to be so connected, there may be or may not be intervening electrical or electronic elements, including but not limited to processors, filters, communication links and the like. So long as the two elements and the embodiment operate as if they are electrically or electronically connected, and they are effectively so connected, the connecting is equivalent. Note the intervening elements may change the form, timing, filtering or aggregation of the signals or data; however, so long as data exiting the connection is responsive to the data entering the connection the connection is equivalent for the purposes of an embodiment or claim.

Communications element—one or more electronic components that send, receive or both, digital or analog data. Methods used include but are not limited to IR light, UV light, visible light, audio, sub-audio, ultrasonic, wireless, near-field or far-field radio, haptic, or other electromagnet communications.

Mechanically coupled or operatively mechanically coupled—transfer weight, motion or pressure from one element to another via the mechanical coupling or operative mechanical coupling. This describes a specific structural element or operation of a specific structural element, not a "functional element" in a claim. As one example, transfer points refers to a structural element, not a functional element. Such structural v. functional applies to claim construction. "Operative" means such that the scale functions as intended. One embodiment mechanically couples from a weighing surface to the free ends of one or more load cells to effectively transfer the weight on the weighing surface to the freed ends of the one or more load cells.

Fluid—such as a sterilizing fluid, may be a liquid, a gas, or an aerosol.

Free of rigid attachment—means the upper module is able to move or transmit weight as motion or as pressure to the lower module. It may sit on or pass through a flexible membrane, or another flexible support, such as rubber pads, hinges, scissors support, or other compliant coupling.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Sterile—pathogen-free. Note that "sterile" may refer to one volumetric area compared to another and may refer only to problematic pathogens, depending on a study, study animals, and safety considerations.

Sealed enclosure—an enclosure sealed against pathogens that impact or alter study results, or alter the credibility or repeatability of study results, entering or leaving the enclosure.

Transmit difference threshold—may be a percentage of weight, or an absolute weight, or a formula incorporating both the percentage and absolute values.

Weighing platform—this term and "upper module" may be used interchangeable. The choice of term is typically based on its functionally in the context of the text. Also a weighing surface, such as the top of the weighing platform, may be used interchangeable with weighing platform.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

We claim:

1. An animal cage comprising:
a cage interior; mutually exclusive of a cage exterior;
  wherein the cage is adapted to house a study animal;
bedding in the cage interior;
a wireless, sterilizable scale in the cage interior comprising:
  a case comprising a case interior comprising interior electronics comprising a weight sensor;
  a horizontal weighing platform;
  a wireless communication port;
  a flexible membrane comprising a perimeter fixed zone, a central penetration zone, and a compliance zone; wherein the compliance zone isolates the fixed zone from the penetration zone;
  wherein the flexible membrane perimeter fixed zone is attached to a respective perimeter portion of the case, defining a lower surface of the flexible membrane facing the interior of the case, and an opposing upper surface of the flexible membrane; wherein the attachment comprises a sterile seal;
  a penetrating fastener, wherein the penetrating fastener penetrates the penetration zone of the flexible membrane, wherein the penetration is sterile sealed; and wherein an upper end of the penetrating fastener is above the flexible membrane and a bottom end of the penetrating fastener is below the flexible membrane;
  a sterile volume, defined by the interior of the case and the lower surface of the flexible membrane;
  wherein the upper end of the penetrating fastener is adapted to removably mechanically mate with the weighing platform;
  wherein the weighing platform comprises a perimeter skirt, adapted such that when the weighing platform is removably mated with the upper end of the penetrating fastener, the perimeter skirt surrounds and overlaps an upper perimeter of the case such that the weighing platform forms a drip-proof covering over the upper surface of the flexible membrane, and upper end of the penetrating fastener;
  a sterile scale volume, defined by the interior of the case and the lower surface of the flexible membrane; wherein the sterile scale volume is free of the study animal, free of the bedding, and free of pathogens;
  a scale pathogen volume, defined by the upper surface of the flexible membrane, a horizontal lower surface of the weighing platform, when the weighing platform is mated to the penetrating fastener; wherein the scale pathogen volume is free of the bedding;
  a scale bedding volume, defined by a gap between the perimeter skirt and the case, maintaining a vertical channel isolating the scale pathogen volume from a remainder of the interior of the animal cage;
  wherein the scale is adapted to transmit a value of a weight of the study animal on the weighing platform; the weight mechanically coupled from the weighing platform through the penetrating fastener to the weight sensor; via the wireless communication port, through the cage interior to the cage exterior.

2. The animal cage of claim 1 wherein:
an exterior of the case of the scale, the upper surface of the flexible membrane and the upper end of the penetrating fastener together form an exterior of a primary module of the scale; and
wherein the primary module and the weighing platform are adapted to be separately sterilized by submersing in a sterilizing fluid.

3. The animal cage of claim 1 wherein:
the penetrating fastener comprises upper electrical contact points above the flexible membrane and lower electrical contact points below the flexible membrane, and wherein at least two of the upper electrical contact points are electrically connected to respective at least two of the lower electrical contact points.

4. The animal cage of claim 3 wherein:
the weighing platform comprises a platform electrical connector adapted to removably mate to the upper electrical contact points.

5. The animal cage of claim 4 wherein:
an exterior of the case, the upper surface of the flexible membrane, the upper electrical contact points and the upper end of the penetrating fastener together form an exterior of a primary module of the scale;
wherein the weighing platform and platform electrical connector together comprise a platform assembly; and
wherein the primary module and the platform assembly are adapted to be separately submersible sterilized in a sterilizing fluid.

6. The animal cage of claim 5 wherein:
the wireless communication port comprises a first and second bi-directional optical communication port and wherein the first and second ports are separated by at least the average diameter of the study animal.

7. The animal cage of claim 1 wherein:
the gap between the inside of the perimeter skirt and an outside edge of the case is in the range of 0.08 to 0.35 inches.

8. The animal cage of claim 1 wherein:
an overlap depth of the perimeter skirt from an upper surface of the case to a lower edge of the perimeter skirt is in the range of 0.125 to 2.0 inches.

9. The animal cage of claim 1 wherein:
a pathogen clearance distance from the upper surface of the flexible membrane to a lower surface of the weighing platform is in the range of 0.08 to 0.36 inches.

10. The animal cage of claim 1 wherein:
the wireless communication port comprises a protocol, transmitting weight data, that is free of device ID specific association with another communicating device.

11. The animal cage of claim 1 wherein:
the wireless communication port comprises a protocol, transmitting weight data, that is free of a specific device ID in each transmitted packet.

12. The animal cage of claim 11 wherein:
the animal cage is in a vivarium comprising at least 100 cages.

13. A method of weighing a study animal in the animal cage of claim 1 comprising the steps:
 waiting for the study animal to be on the weighing platform of the sterilizable weighing scale of claim 1;
 transmitting a weight of the study animal using the sterilizable weighing scale of claim 1.

14. A method of sterilizing the wireless, sterilizable scale in the animal cage of claim 1 comprising the steps:
 removing the wireless, sterilizable scale from the cage;
 disassembling the weighing platform from the upper end of the penetrating fastener;
 sterilizing the weighing platform and the case separately by submerging each in a sterilizing fluid;
 reassembling the lid with the upper end of the penetrating fastener;
 placing the wireless, sterilizable scale in a second cage.

* * * * *